US011580931B2

(12) United States Patent
Nam et al.

(10) Patent No.: US 11,580,931 B2
(45) Date of Patent: Feb. 14, 2023

(54) DISPLAY DEVICE AND METHOD OF OPERATING THE SAME

(71) Applicant: LG ELECTRONICS INC., Seoul (KR)

(72) Inventors: Yeonoh Nam, Seoul (KR); Myongyoung Lee, Seoul (KR); Sangchurl Nam, Seoul (KR); Younjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/349,099

(22) Filed: Jun. 16, 2021

(65) Prior Publication Data

US 2022/0375426 A1 Nov. 24, 2022

(30) Foreign Application Priority Data

May 21, 2021 (KR) ........................ 10-2021-0065782

(51) Int. Cl.
G09G 3/04 (2006.01)
G09G 5/04 (2006.01)
G09G 3/20 (2006.01)
G06T 7/90 (2017.01)

(52) U.S. Cl.
CPC ................. G09G 5/04 (2013.01); G06T 7/90 (2017.01); G09G 3/2003 (2013.01); G06T 2207/10024 (2013.01); G09G 2320/0242 (2013.01); G09G 2340/06 (2013.01)

(58) Field of Classification Search
CPC .................. G09G 5/04; G09G 3/2003; G09G 2320/0242; G09G 2340/06; G06T 7/90; G06T 2207/10024
See application file for complete search history.

(56) References Cited

U.S. PATENT DOCUMENTS

| 9,710,932 | B2 | 7/2017 | Park et al. | |
|---|---|---|---|---|
| 10,446,092 | B2 | 10/2019 | Aragane | |
| 10,600,213 | B2* | 3/2020 | Shih | G09G 5/02 |
| 2014/0002481 | A1 | 1/2014 | Broughton et al. | |
| 2015/0356952 | A1* | 12/2015 | Lee | G09G 5/10 345/589 |
| 2016/0293139 | A1* | 10/2016 | Kwon | G06F 3/03547 |
| 2018/0130446 | A1* | 5/2018 | Guest | G06F 3/147 |
| 2019/0377113 | A1* | 12/2019 | Tao | G02B 5/223 |

FOREIGN PATENT DOCUMENTS

| CN | 106571126 A | 4/2017 |
|---|---|---|
| EP | 3 537 422 A2 | 9/2019 |
| EP | 3 800 626 A1 | 4/2021 |
| JP | 2015-527601 A | 9/2015 |
| KR | 10-2015-0098976 A | 8/2015 |
| KR | 10-2016-0023810 A | 3/2016 |

* cited by examiner

Primary Examiner — Sahlu Okebato
(74) Attorney, Agent, or Firm — Birch, Stewart, Kolasch & Birch, LLP

(57) ABSTRACT

A display device includes a display configured to display an image and a controller configured to reduce a blue component in the image when an execution command of a blue light reduction function is received. The controller may detect a preset part or color and perform control such that an amount of reduction of a blue component of an area corresponding to the detected part or color is different from that of the remaining area.

14 Claims, 13 Drawing Sheets (a)

(b)

Original image      Image in which blue light is reduced (a)      (b)

(a)

(b)

DISPLAY DEVICE AND METHOD OF OPERATING THE SAME

CROSS-REFERENCE TO RELATED APPLICATIONS

The present application claims priority under 35 U.S.C. 119 and 35 U.S.C. 365 to Korean Patent Application No. 10-2021-0065782 filed on May 21, 2021, which is hereby incorporated by reference in its entirety.

BACKGROUND

The present disclosure relates to a display device and a method of operating the same and, more particularly, to blue light reduction function executed in a display device.

Blue light is a light source of blue in a wavelength range of 300 to 500 nanometers and has shortest wavelength and strong energy among visible lights. Prolonged exposure to blue light is known to have adverse effects on eyes, such as eye fatigue or dry eye syndrome.

Therefore, a display device such as a smartphone, a computer monitor or a TV tends to provide a blue light reduction function. However, since the blue light reduction function intentionally reduces a blue component, there is a disadvantage in that a screen is output in yellow as a whole. Due to this disadvantage, the blue light reduction function is being disregarded by users.

SUMMARY

The present disclosure provides a display device for minimizing color distortion while executing a blue light reduction function, and a method of operating the same.

The present disclosure provides a display device for minimizing a problem that a screen is output in yellow while executing a blue light reduction function, and a method of operating the same.

The present disclosure provides a display device for minimizing user inconvenience while executing a blue light reduction function, and a method of operating the same.

According to the present disclosure, it is possible to minimize reduction of a blue component with respect to a part or color, change of which is sensitive to users while executing a blue light reduction function.

A display device according to an embodiment of the present application comprises a display configured to display an image, and a controller configured to reduce a blue component in the image when an execution command of a blue light reduction function is received, wherein the controller detects a preset part or color and performs control such that an amount of reduction of a blue component of an area corresponding to the detected part or color is different from that of the remaining area.

The controller performs control such that the amount of reduction of the blue component of the area corresponding to the detected part or color is less than that of the remaining area.

The preset part comprises a part corresponding to human skin.

The preset color comprises a white color.

The preset color comprises a blue color.

The preset part comprises a part having a B value equal to or less than a preset reference value.

The preset part comprises a part corresponding to a background image.

The controller reduces the blue component by moving a white point (WP), and an amount of movement of a WP in the area corresponding to the detected part or color is less than that of a WP in the remaining area.

The controller gradually changes a color in the vicinity of a boundary between the area corresponding to the predetermined part or color and the remaining area.

The controller performs control such that an amount of movement of a color in a protection area corresponding to the preset part or color according to execution of the blue light reduction function is different from that of a color in the remaining area.

A method of operating a display device according to an embodiment of the present application comprises displaying an image, receiving an execution command of a blue light reduction function, and reducing a blue component in the image when the blue light reduction function is executed, wherein the reducing the blue component comprises detecting a preset part or color, and performing control such that an amount of reduction of a blue component of an area corresponding to the detected part or color is different from that of the remaining area.

The detecting the preset part or color comprises detecting a part corresponding to human skin, a part corresponding to a B value equal to or less than a preset reference value, a part corresponding to a background image, a blue color or a white color.

The reducing the blue component comprises reducing the blue component by moving a white point (WP), and an amount of movement of a WP in an area corresponding to the detected part or area is less than that of a WP in the remaining area.

The reducing the blue component comprises gradually changing a color in the vicinity of a boundary between an area corresponding to the preset part or color and the remaining area.

The method further comprising gradually changing a color in the vicinity of a boundary between an area corresponding to the preset part or color and the remaining area.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
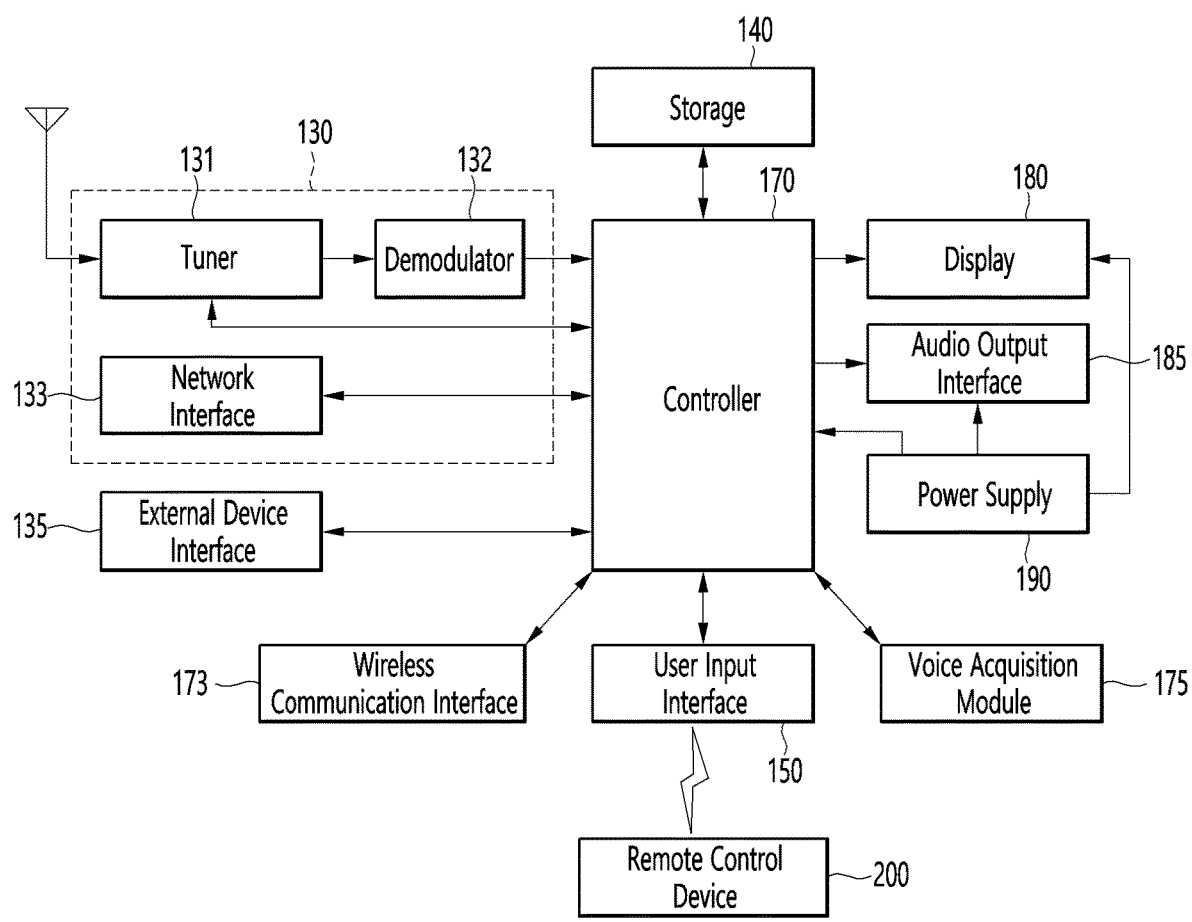
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
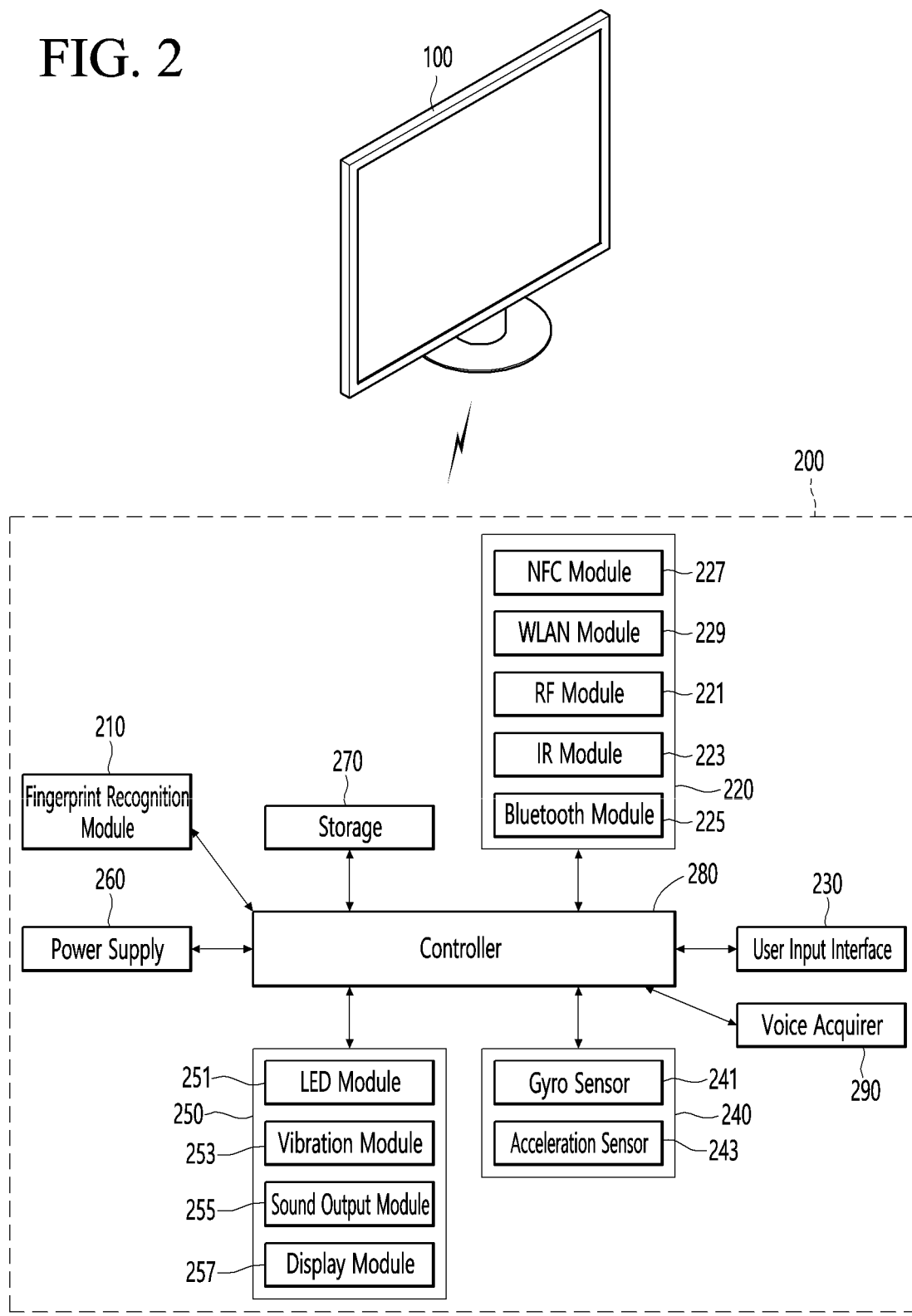
FIG. 2 is a block diagram illustrating a remote control device according to an embodiment of the present disclosure.
Figure 3:
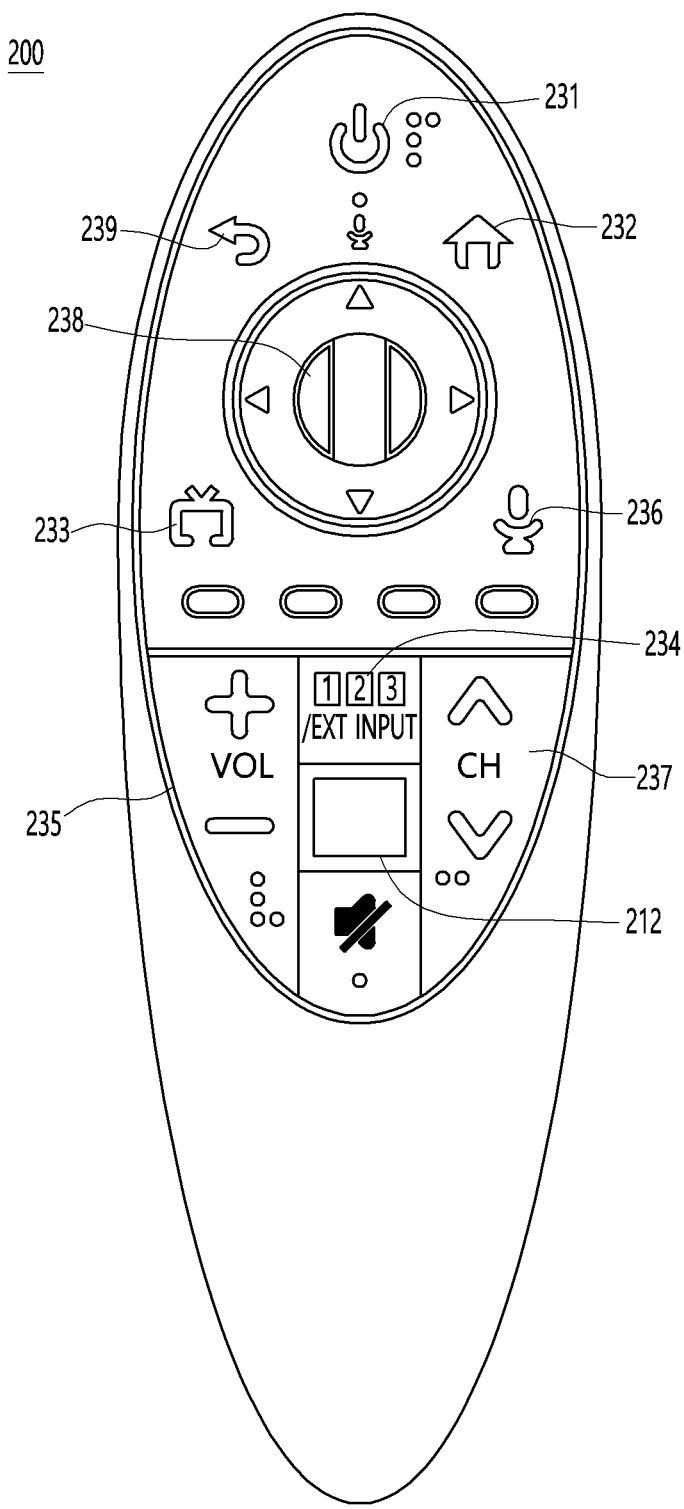
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
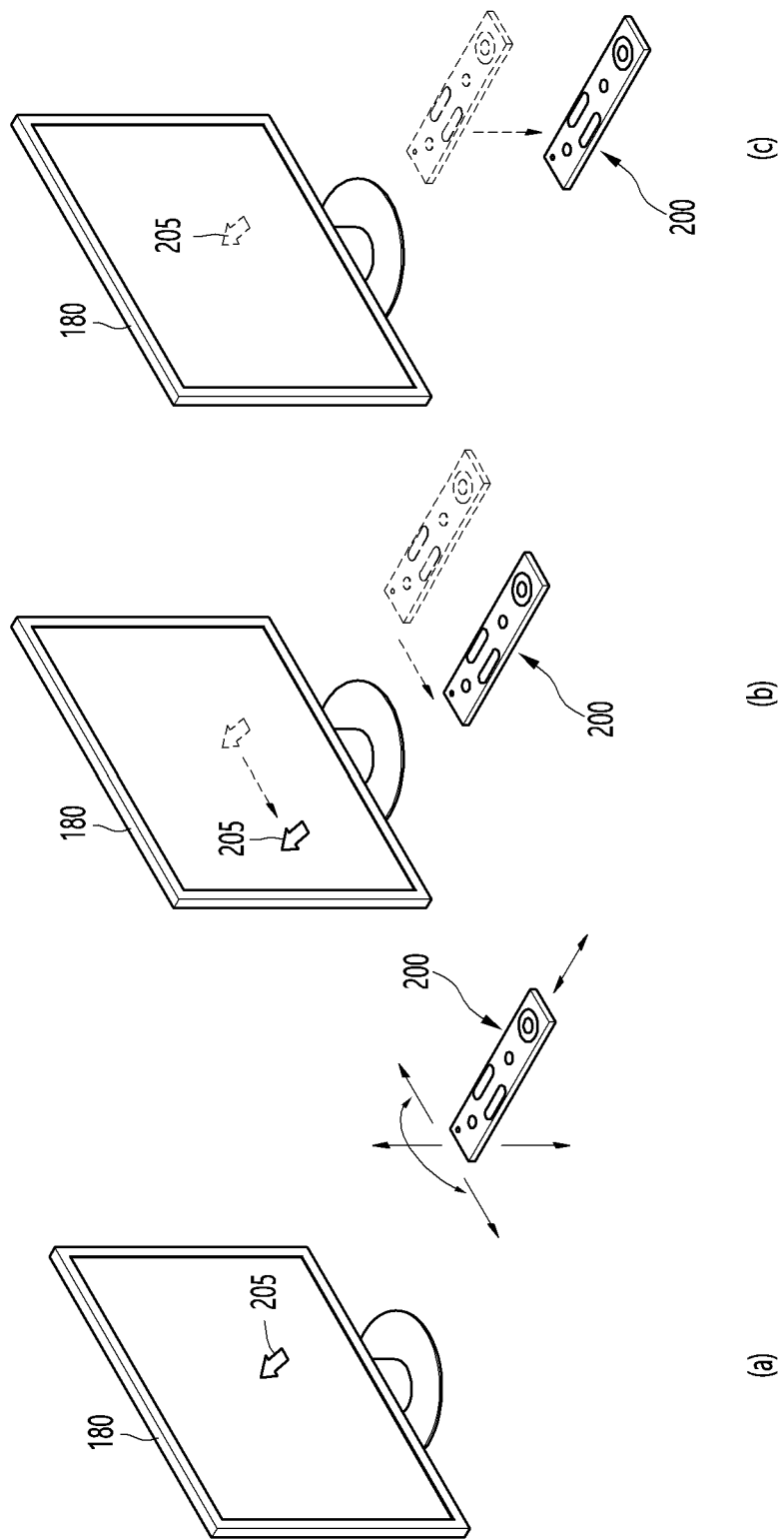
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Meanwhile, blue light may be generated on the display 180. Blue light is a light source of blue in a wavelength range of 300 to 500 nanometers and has shortest wavelength and strong energy among visible lights. Prolonged exposure to blue light is known to have adverse effects on eyes, such as eye fatigue or dry eye syndrome.

Therefore, the display device 100 may provide a blue light reduction function. That is, the display device 100 may reduce blue light generated on the display 180 when the blue light reduction function is executed.

Specifically, the controller 170 may reduce output of a blue color on the display 180, when executing the blue light reduction function. The controller 170 may reduce output of a blue color by controlling a color temperature. The controller may reduce output of a blue color by moving a white point (WP).

Next, the principle of reducing output of the blue color through color temperature control (or white point movement) will be described with respect to the drawings. Meanwhile, although a description is based on a RGB color space in the present specification, this is merely an example for convenience of description and thus the present disclosure is not limited thereto.

Based on the RGB color space, each pixel expresses a color through a combination of R, G and B. In addition, each pixel may be implemented by an R subpixel, a G subpixel and a B subpixel, the R component may mean output of R subpixels, the G component may mean output of G subpixels and the B component may mean output of B subpixels.

Figure 5:
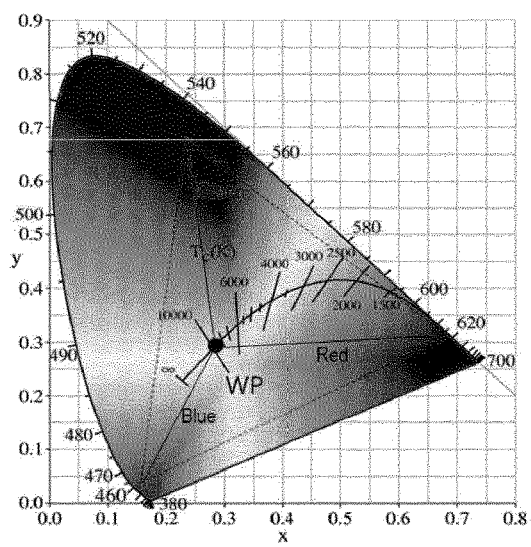
FIG. 5 is a view illustrating a change in RGB according to a change in color temperature.
Figure 5:
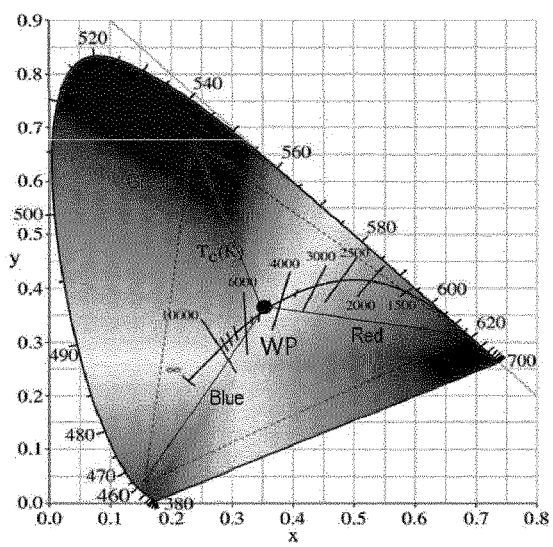

FIG. 5 is a view illustrating a change in RGB according to a change in color temperature.

(a) of FIG. 5 shows RGB when a color temperature is about 9000 K and (b) of FIG. 5 shows RGB when a color temperature is about 5000 K. Referring to (a) and (b) of FIG. 5, when the color temperature is lowered, a white point WP moves from blue to yellow in a state in which vertexes of red, blue and green are fixed. Therefore, even when the same image signal is input, the blue color output from the display 180 decreases and a yellow color increases.

Accordingly, when the color temperature is reduced, blue light decreases and yellow increases.

Figure 6:
FIG. 6 shows a change in output image as a color temperature is reduced in the related art.
Figure 6:
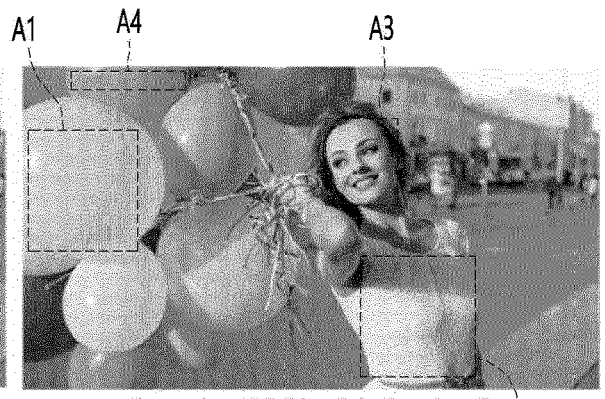

FIG. 6 shows a change in output image as a color temperature is reduced in the related art.

(a) of FIG. 6 shows an original image and (b) of FIG. 6 shows an image output by reducing the color temperature of the same image as (a) of FIG. 6.

Referring to FIG. 6, when the color temperature is reduced and the white point moves as shown in FIG. 5, the blue color is generally reduced, but color distortion occurs. For example, an area A1 or A2 of FIG. 6 has a white color but is output in yellow. In addition, an area A3 of FIG. 6 is a part of human skin and may be output in yellow as yellow becomes strong. In addition, an area A4 has a blue color but is expressed in another color such as a blue green color due to reduction of the blue color.

In the related art, as the colors of the color gamut move throughout the image by reducing the color temperature, the blue color is effectively reduced, but the other colors may be distorted.

In particular, since human skin or a white color is a memory color, users may sensitively recognize a change in such colors and feel uncomfortable. In addition, when a blue color is a preferred color, a user may feel uncomfortable due to a change in preferred color. For this reason, users tend to avoid use of the blue light reduction function.

Therefore, the present disclosure provides a blue light reduction function capable of minimizing user inconvenience. Specifically, the present disclosure provides a blue light reduction function capable of minimizing a change in memory color or preferred color.

Figure 7:
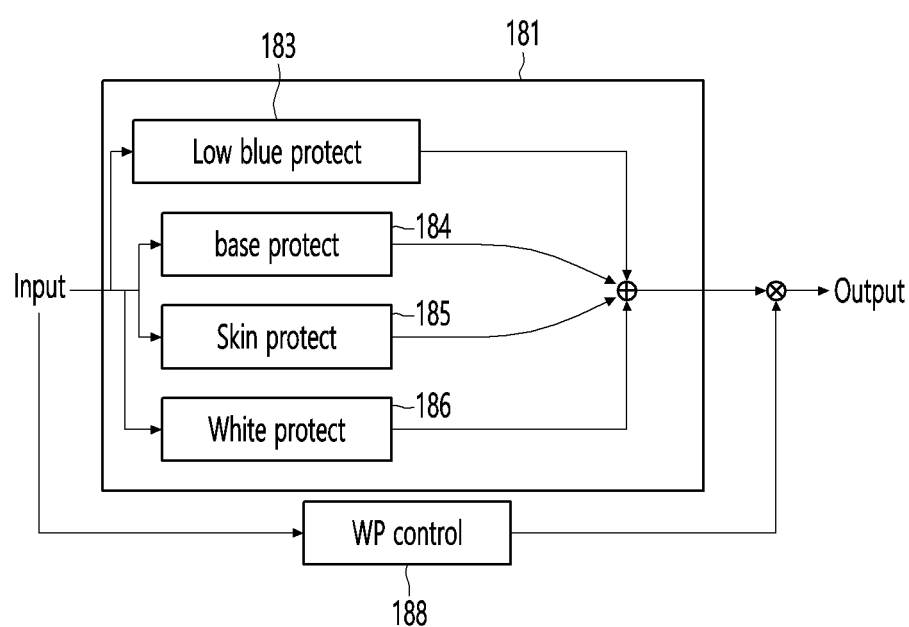
FIG. 7 is a control block diagram illustrating a blue light reduction function according to an embodiment of the present disclosure.
Figure 8:
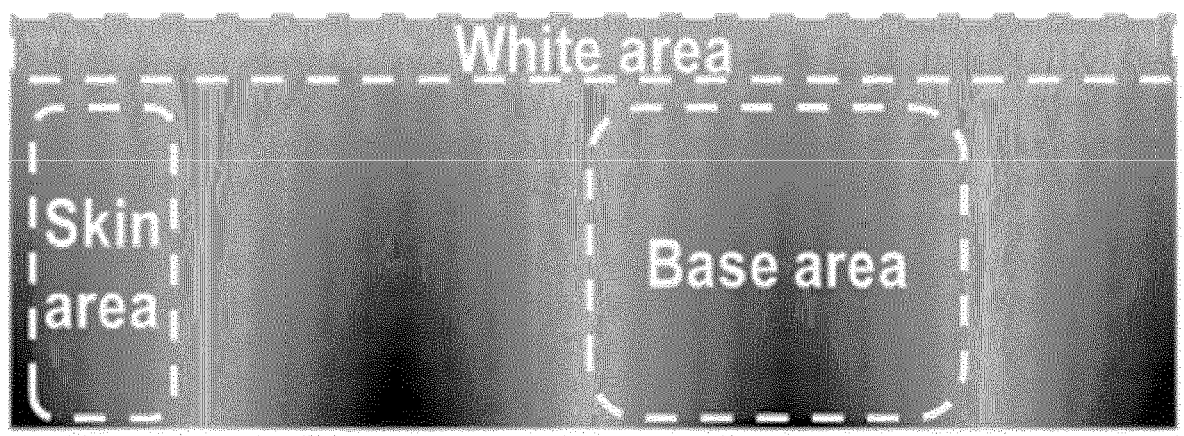
FIG. 8 is a view illustrating a color detected as a protection area by a color protection unit of FIG. 7.

FIG. 7 is a control block diagram illustrating a blue light reduction function according to an embodiment of the present disclosure, and FIG. 8 is a view illustrating a color detected as a protection area by a color protection unit of FIG. 7.

The display device 100 may include at least one of a color protection unit 181 or a WP controller 188. The color protection unit 181 and the WP controller 188 may be one component of the controller 170.

The color protection unit 181 may obtain a protection area in which a color change is minimized when executing the blue light reduction function.

The protection area may be an area in which a color change is minimized when performing the blue light reduction function. The color protection unit 181 may preset the protection area. The color protection unit 181 may set an area having a specific part or a specific color as the protection area. The color protection unit 181 may detect a preset part or color and obtain an area corresponding to the detected part or color as the protection area.

The preset part may include a part corresponding to human skin, a part having a B value equal to or less than a preset reference value or a part corresponding to a background image, but this is only an example and the present disclosure is not limited thereto.

The preset color may include a white color or a blue color, but this is only an example and the present disclosure is not limited thereto.

The color protection unit 181 may include at least one of a low blue protection unit 183, a base protection unit 184, a skin protection unit 185 or a white protection unit 186. Each of the low blue protection unit 183, the base protection unit 184, the skin protection unit 185 and the white protection unit 186 may detect a protection area in which a color change will be minimized.

The low blue protection unit 183 may detect an area composed of pixels having a B value equal to or less than the preset reference value (e.g., a first reference value). In the case of a pixel having a small B value among RGB signals, the blue color in the pixel is mixed to express another color. The low blue protection unit 183 may detect a low blue area such that the corresponding color is accurately expressed by mixing the blue color as intended. In addition, since the amount of blue light emitted from the pixel having the small B value is very small compared to the total amount of blue light, the low blue protection unit 183 may detect a low blue area to minimize a color change in the low blue area.

The base protection unit 184 may detect an area having a blue color. For example, the base protection unit 184 may detect an area composed of pixels having a B value equal to or greater than a preset reference value (e.g., a second reference value). A pixel having a large B value is intended to be expressed by a blue color and is to minimize a serious color distortion problem when it is expressed in another color in order to reduce blue light. Accordingly, the base protection unit 184 may detect pixels having a B value equal to or greater than the preset reference value, that is, an area having a blue color, to minimize a color change in a blue color area. The area having the blue color is a color area such as a base area shown in FIG. 8, but this is only an example and the present disclosure is not limited thereto.

The skin protection unit 185 may detect a part corresponding to human skin. The skin protection unit 185 may pre-store an RGB range (e.g., a first RGB range) recognized as a human skin color. Accordingly, the skin protection unit 185 may detect a part corresponding to the pre-stored RGB range as a part corresponding to human skin. The part corresponding to human skin may be a color area such as a skin area of FIG. 8, but this is only an example and the present disclosure is not limited thereto.

The white protection unit 186 may detect an area corresponding to a white color. Similarly, the white protection unit 186 may pre-store an RGB range (e.g., a second RGB range) recognized as a white color. Accordingly, the white protection unit 186 may detect a part corresponding to the pre-stored RGB range as an area corresponding to a white color. The area corresponding to the white color may be a color area such as a white area of FIG. 8, but is only an example and the present disclosure is not limited thereto.

Meanwhile, although not shown in FIG. 7, the color protection unit 181 may further include a background protection unit (not shown). The background protection unit (not shown) may detect a part corresponding to a background image. For example, the background protection unit (not shown) may detect an object in an image through object detection, and detect a part corresponding to a background image based on the detected object. When the color of the background image is changed, users may sensitively recognize it. Therefore, in order to minimize this, the background protection unit (not shown) may detect the part corresponding to the background image. Meanwhile, performing object detection in order to detect the part corresponding to the background image is only an example, and there may be various methods of detecting the part corresponding to the background image.

As described above, the color protection unit 181 may detect an area corresponding to human skin, a part corresponding to a B value equal to or less than a preset reference value, an area corresponding to a white color or a blue color and a part corresponding to a background image.

The WP controller 188 may control the white point of the image. Specifically, the WP controller 188 may control the white point of at least one area of the image. When the image is divided into a plurality of areas, the WP controller 188 may control the WP of each of the plurality of areas. For example, the WP controller 188 may control the location of the WP of an area detected by the color protection unit 181 to be different from that of the WP of an area which is not detected by the color protection unit 181. The WP controller 188 may individually control the WP such that the amount of reduction of a blue component of the protection area detected by the color protection unit 181 is less than that of the remaining area.

For example, the WP controller 188 may perform control such that the WP of the protection area detected by the base protection unit 184, the skin protection unit 185, the white protection unit 186 or the background protection unit (not shown) is different from that of the remaining area.

Figure 9:
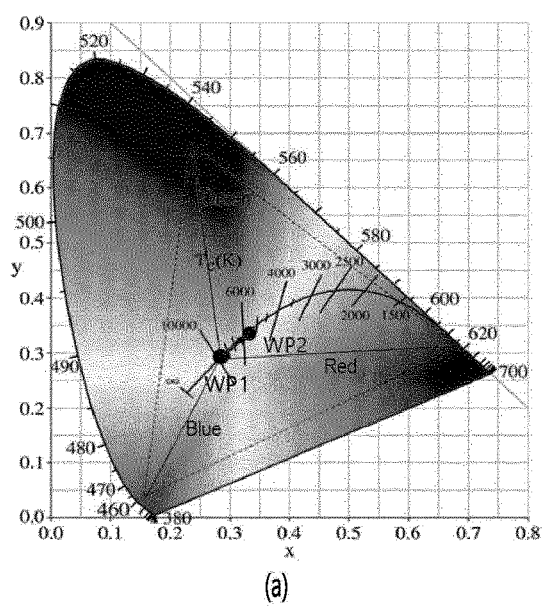
FIG. 9 is a view illustrating an example of a method of differently controlling a WP by a controller according to an embodiment of the present disclosure.
Figure 9:
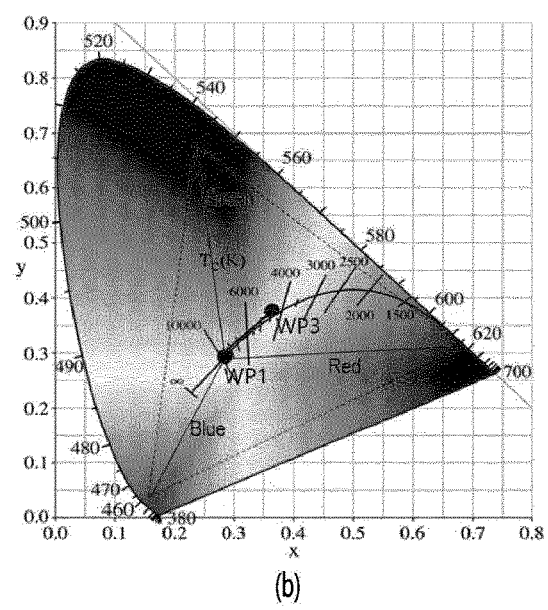

FIG. 9 is a view illustrating an example of a method of differently controlling a WP by a controller according to an embodiment of the present disclosure.

The controller 170 may change the WP of an area corresponding to a preset part or color from a first WP WP1 to a second WP WP2 as shown in (a) of FIG. 9, and change the WP of the remaining area from the first WP WP1 to a third WP WP3 as shown in (b) of FIG. 9. That is, the controller 170 may differently move the location of the white point WP depending on whether it is a preset part or color. The second WP WP2 may be closer to a blue vertex than the third WP WP3.

Therefore, the amount of reduction of the blue component in an area corresponding to the preset part or color may be controlled to be less than that of the blue component in the remaining area.

Meanwhile, the WP of the area detected by the low blue protection unit 183 may be differently controlled as described above. However, in this case, since color distortion is highly likely to occur and thus the controller 170 may change the WP of the area detected by the low blue protection unit 183 to be equal to that of the remaining area and separately control the amount of reduction of the B value.

For example, the controller 170 changes at least one of the R value, G value and B value of each pixel according to change in WP, and may apply a protection rate such that the change of the B value is minimized. That is, the controller 170 may calculate the amount of movement of RGB for each pixel while changing the WP to the third WP as shown in (b) of FIG. 9 in the case of the low blue area. At this time, in the case of the B value, the calculated amount of movement may be small by applying the protection rate.

The protection rate may be a constant for reducing the amount of reduction of the B value. The protection rate may be applied to only a pixel having a B value less than a preset reference value. That is, the protection rate may be applied to a pixel in a row blue area. In addition, as the B value decreases, the protection rate may increase.

Figure 10:
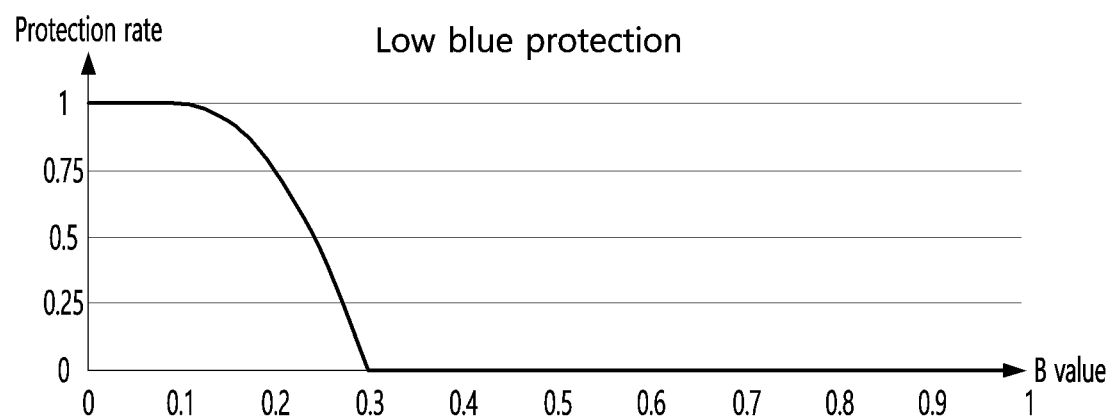
FIG. 10 is a view showing a protection rate applied to a low blue area according to an embodiment of the present disclosure.

FIG. 10 is a view showing a protection rate applied to a low blue area according to an embodiment of the present disclosure.

When a horizontal axis is a B value and a vertical axis is a protection rate, the protection rate of 0 is applied to a pixel having a B value equal to or greater than a preset reference value, such that the B value is reduced according to movement of the WP.

Meanwhile, the controller 170 may apply a protection rate greater than 0 and equal to or less than 1 to a pixel having a B value less than a preset reference value, thereby reducing the B value to be less than the amount of reduction according to movement of the WP.

For example, the controller 170 may reduce the B value from 20 to 10 as the WP of a specific area is changed. That is, the amount of reduction of the B value according to change of the WP may be 10. However, when the area corresponds to a low blue area, the controller 170 may control the amount of reduction of the B value to 10 or less according to the protection rate. That is, the controller 170 may control the B value to a value between 20 to 10.

In summary, the controller 170 may apply the protection rate, such that the amount of reduction of the B value according to change of the WP is 10 but the amount of reduction of the B value in the low blue area is 10 or less.

Therefore, the controller 170 can increase reproducibility of an intended color in the low blue area.

Figure 11:
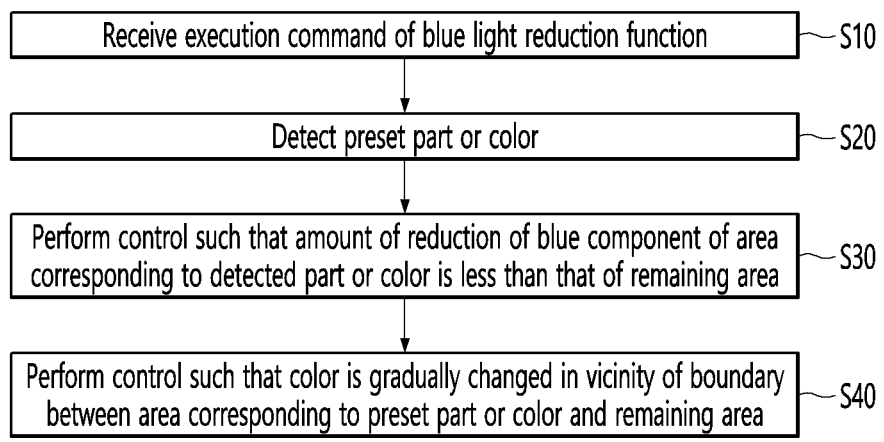
FIG. 11 is a flowchart illustrating a method of operating a display device according to an embodiment of the present disclosure.

FIG. 11 is a flowchart illustrating a method of operating a display device according to an embodiment of the present disclosure.

The controller 170 may receive an execution command of a blue light reduction function (S10).

For example, the display 180 may display a menu for receiving whether the blue light reduction function is executed. The controller 170 may receive a command for selecting whether the blue light reduction function is executed through the menu displayed on the display 180. The controller 170 may receive the execution command of the blue light reduction function through the user input interface 150.

When the execution command of the blue light reduction function is received, the controller 170 may reduce a blue component in an image. That is, the controller 170 may reduce the B value of each pixel configuring the image.

Meanwhile, according to the present disclosure, the controller 170 may detect a preset part or a preset color and perform control such that the amount of reduction of a blue component of an area corresponding to the detected part or color is different from that of the remaining area. Specifically, the controller 170 may perform control such that the amount of reduction of a blue component of an area corresponding to the detected part or color is less than that of the remaining area. Hereinafter, this will be described in detail.

When the execution command of the blue light reduction function is received, the controller 170 may detect the preset part or color (S20).

The preset part or color may be the above-described protection area. That is, the protection area may include a blue area (an area having a B value equal to or less than a preset reference value), an area corresponding to a blue color, an area corresponding to a white color, an area corresponding to human skin or an area corresponding to a background image.

The controller 170 may perform control such that the amount of reduction of the blue component of the area corresponding to the detected part or color is less than that of the remaining area (S30).

According to an embodiment, the controller 170 may reduce the blue component by moving a white point (WP). Specifically, the controller 170 may perform control such that the amount of reduction of the blue component of the area corresponding to the detected part or color is less than that of the remaining area, by changing the WP of the area corresponding to the detected part or color to be different from that of the remaining area. That is, the controller 170 may perform control such that the amount of movement of a color in the protection area corresponding to the preset part or color according to execution of the blue light reduction function is different from that of the color in the remaining area. Therefore, the amount of movement of the WP in the area corresponding to the part or color detected in step S20 may be less than that of the WP in the remaining area.

According to another embodiment, the controller 170 may perform control such that the amount of reduction of the blue component of the area corresponding to the detected part or color is less than that of the remaining area, by applying a protection rate such that the amount of reduction of the B value of the area corresponding to the detected part or color is less than that of the remaining area.

Meanwhile, the above-described embodiments may be combined.

In addition, the controller 170 may perform control such that a color is gradually changed in the vicinity of a boundary between the area corresponding to the preset part or color and the remaining area (S40).

Figure 12:
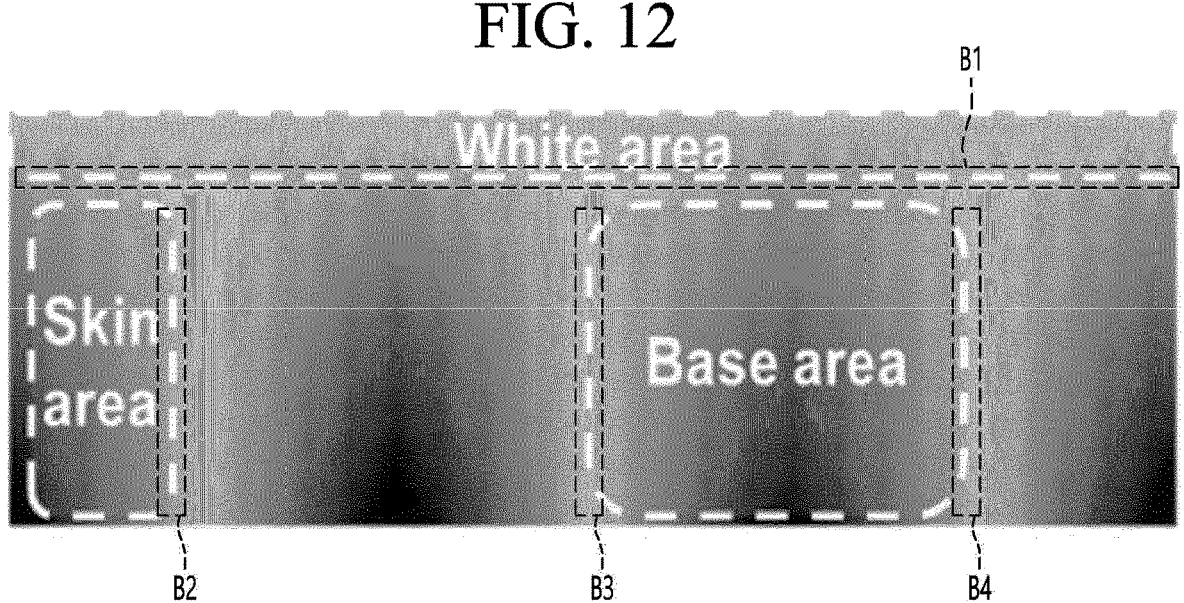
FIG. 12 is a view showing the vicinity of a boundary between an area corresponding to a preset part or color and the remaining area according to an embodiment of the present disclosure.

FIG. 12 is a view showing the vicinity of a boundary between an area corresponding to a preset part or color and the remaining area according to an embodiment of the present disclosure.

The vicinity of the boundary between the area corresponding to the preset part or color and the remaining area may include pixels corresponding to the boundary between the area corresponding to the preset part or color and the remaining area and the corresponding pixel±n pixels (e.g., n being 5).

For example, the vicinity of the boundary of the area corresponding to the preset part or color and the remaining area may be first to fourth blocks B1, B2, B3 and B4 shown in FIG. 12, but this is only an example and the present disclosure is not limited thereto.

The controller 170 may adjust the RGB value of the corresponding pixel such that a color is gradually changed in the vicinity of the boundary between the area corresponding to the preset part or color and the remaining area. That is, the color may be rapidly changed in the boundary between the area corresponding to the preset part or color and the remaining area. That is, the color may be rapidly changed in the boundary between the area corresponding to the preset part or color and the remaining area. Therefore, in order to suppress such a rapid change, the controller 170 may generate soft transition. The controller 170 may gradually change the color in the vicinity of the boundary between the area corresponding to the preset part or color and the remaining area.

In some embodiments, step S40 may be omitted.

According to an embodiment of the present disclosure, the WP of the image may be adaptively moved for each area, instead of global movement. That is, according to the embodiment of the present disclosure, local adaptive WP movement may be performed instead of global WP. Local adaptive WP movement of the present disclosure may be confirmed through output of the image shown in FIG. 13.

Figure 13:
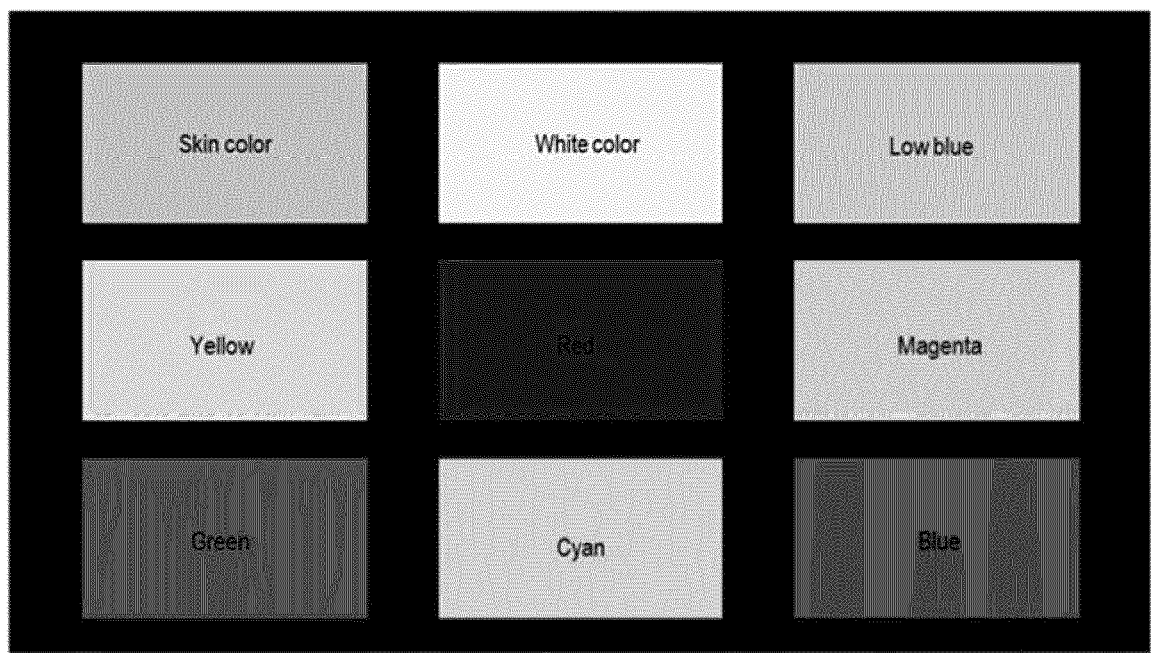
FIG. 13 is a view showing an image in which movement of a white point is confirmed for each area according to an embodiment of the present disclosure.

FIG. 13 is a view showing an image in which movement of a white point is confirmed for each area according to an embodiment of the present disclosure.

The controller 170 may receive an image including at least one of a skin color, a white color, a low blue color or a blue color and at least one of the other colors, and, in this case, perform control such that the WP of the skin color, the white color, the low blue color or the blue color is different from that of the other color. Here, the low blue color has a B value equal to or less than a preset reference value and has an R value and a G value less than the B value.

As a specific example, the controller 170 may receive an image including a skin color, a white color, a low blue color, a yellow color, a red color, a magenta color, a green color, a cyan color and a blue color, but this is merely an example and the present disclosure is not limited thereto.

According to an embodiment, when the image shown in FIG. 13 is input while the blue light reduction function is executed, the controller 170 may perform control such that the WP of each of the skin color, the white color, the low blue color and the blue color is different from that of each of the yellow color, the red color, the magenta color, the green color and the cyan color. Different WPs may mean that the locations of the WPs are different.

According to another embodiment, when the image shown in FIG. 13 is input while the blue light reduction function is executed, the controller 170 may perform control such that the WP of each of the skin color, the white color and the blue color is different from that of each of the low blue color, the yellow color, the red color, the magenta color, the green color and the cyan color, and, at the same time, apply a protection rate to the B value of the low blue color, thereby reducing the amount of reduction of the B value.

According to the above-described various embodiments, it can be seen that the WP of at least a partial area is different from that of the other area. That is, it can be seen that, when the WP of the at least partial area is changed to be different from that of the other area, the amount of reduction of the blue component of a specific area is less than that of the remaining area.

According to an embodiment of the present disclosure, since a change in specific part or color is minimized while a blue light reduction function is executed, and a blue component is reduced in the remaining part, it is possible to reduce blue light while minimizing color distortion.

According to an embodiment of the present disclosure, since a change in part or color, change of which is sensitive to users, is minimized, it is possible to reduce blue light while minimizing user inconvenience.

The present disclosure may be embodied as computer-readable code on a medium having a program recorded thereon. The computer-readable recording medium may be all types of recording devices that can store data which can be read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. Therefore, the detailed description should not be construed as restrictive in all respects and should be considered as illustrative. The scope of this specification should be determined by reasonable interpretation of the appended claims, and all changes within the equivalent scope of this specification are included in the scope of this specification.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
a display configured to display an image; and
a controller configured to:
determine the image includes a first part having a human skin color, a second part having a white color, a third part having a blue color, a fourth part corresponding to a background and a fifth part corresponding to a boundary between a remaining area of the image and the first part, the second part, the third part, and the fourth part, and
in response to an execution command for reducing a blue light of the display, individually reduce an amount of the blue light for each of the first part, the second part, the third part, the fourth part and the fifth part of the image,
wherein the controller is further configured to:
in response to the execution command for reducing the blue light of the display, individually reduce the amount of the blue light for each of the first part, the second part, the third part, the fourth part and the fifth part of the image to be less than that of a remaining part of the image, and
wherein the controller is further configured to:
gradually change a color in a vicinity of the boundary of the fifth part determined to be included in the image.

2. The display device of claim 1, wherein the controller is further configured to:
in response to determining the image includes the third part having the blue color, determine if the third part has a blue color value equal to or less than a preset reference value.

3. The display device of claim 2, wherein the controller is further configured to:
in response to determining the third part has the blue color value equal to or less than the preset reference value, reduce the amount of the blue light for the third part to be different than the amount of blue light reduced for the third part having the blue color greater than the preset reference value.

4. The display device of claim 1, wherein the controller is further configured to:

determine the image includes the first part having the human skin color by comparing the first part with a pre-stored RGB range recognized as a human skin color.

5. The display device of claim 1, wherein the controller is further configured to:
determine the image includes the second part having the white color by comparing the second part with a pre-stored RGB range recognized as a white color.

6. The display device of claim 1, wherein the controller is further configured to:
individually control a white point of each of the first part, the second part, the third part, the fourth part and the fifth part determined to be included in the image to reduce the amount of blue light.

7. The display device of claim 1, wherein the controller is further configured to:
individually reduce the amount of the blue light for each of the first part, the second part, the third part, the fourth part and the fifth part of the image to be less than that of the remaining part of the image by moving a white point (WP) an amount that is less than that of a WP in the remaining part of the image.

8. A method of operating a display device, comprising:
displaying an image on a display of the display device;
determining, via a controller of the display device, the image includes a first part having a human skin color, a second part having a white color, a third part having a blue color, a fourth part corresponding to a background and a fifth part corresponding to a boundary between a remaining area of the image and the first part, the second part, the third part, and the fourth part;
in response to an execution command for reducing a blue light of the display, individually reducing, via the controller, an amount of the blue light for each of the first part, the second part, the third part, the fourth part and the fifth part of the image;
in response to the execution command for reducing the blue light of the display, individually reducing the amount of the blue light for each of the first part, the second part, the third part, the fourth part and the fifth part of the image to be less than that of a remaining part of the image; and
gradually change a color in a vicinity of the boundary of the fifth part determined to be included in the image.

9. The method of claim 8, further comprising:
in response to determining the image includes the third part having the blue color, determining if the third part has a blue color value equal to or less than a preset reference value.

10. The method of claim 9, further comprising:
in response to determining the third part has the blue color value equal to or less than the preset reference value, reducing the amount of the blue light for the third part to be different than the amount of blue light reduced for the third part having the blue color greater than the preset reference value.

11. The method of claim 8, further comprising:
determining the image includes the first part having the human skin color by comparing the first part with a pre-stored RGB range recognized a human skin color.

12. The method of claim 8, further comprising:
determining the image includes the second part having the white color by comparing the second part with a pre-stored RGB range recognized a white color.

13. The method of claim 8, further comprising:
individually control a white point of each of the first part, the second part, the third part, the fourth part and the fifth part determined to be included in the image.

14. The method of claim 8, further comprising:
individually reducing the amount of the blue light for each of the first part, the second part, the third part, the fourth part and the fifth part of the image to be less than that of the remaining part of the image by moving a white point (WP) an amount that is less than that of a WP in the remaining part of the image.

* * * * *